United States Patent [19]
Kinoshita

[11] 3,970,163
[45] July 20, 1976

[54] AUTOMOTIVE VEHICLE DRIVE

[75] Inventor: Keijiro Kinoshita, Yokohama, Japan

[73] Assignee: Nissan Motor Co., Ltd., Japan

[22] Filed: Oct. 15, 1974

[21] Appl. No.: 514,916

[30] Foreign Application Priority Data
Oct. 23, 1973    Japan .............................. 48-119118

[52] U.S. Cl. ............................. 180/65 A; 180/66 R; 180/66 A
[51] Int. Cl.² ......................................... B60K 9/00
[58] Field of Search .............. 180/65 A, 66 A, 66 R, 180/67; 290/52, 45, 46, 19, 25, 16, 17

[56] References Cited
UNITED STATES PATENTS

| | | | |
|---|---|---|---|
| 1,340,249 | 5/1920 | Pieper | 290/19 |
| 2,336,052 | 12/1943 | Anderson et al. | 180/66 A |
| 3,499,163 | 3/1970 | Verreault | 290/16 |
| 3,525,874 | 8/1970 | Toy | 180/65 A |
| 3,530,356 | 9/1970 | Aronson | 180/65 R |
| 3,543,873 | 12/1970 | Toy | 180/65 |
| 3,565,202 | 2/1971 | Evans et al. | 180/65 A |
| 3,620,323 | 11/1971 | Maeda et al. | 180/65 A |
| 3,650,345 | 3/1972 | Yardney | 180/65 A |
| 3,772,526 | 11/1973 | Alwers | 290/52 |
| 3,791,473 | 2/1974 | Rosen | 180/65 A |

Primary Examiner—M. H. Wood, Jr.
Assistant Examiner—David M. Mitchell
Attorney, Agent, or Firm—Robert E. Burns; Emmanuel J. Lobato; Bruce L. Adams

[57] ABSTRACT

Poor torque characteristics especially at low and intermediate speeds of a single shaft gas turbine engine is compensated for by the motor torque of a motor-generator having its armature directly coupled with the turbine shaft of the engine. The turbine shaft is connected through a reduction gear to a hydraulic torque converter followed by a forward-reverse gearbox to drive vehicle wheels.

5 Claims, 3 Drawing Figures

AUTOMOTIVE VEHICLE DRIVE

The present invention relates to an automotive drive, and more particularly to an automotive drive for driving vehicles, such as passenger cars, utilizing both electric power and mechanical power, viz., a single-shaft gas turbine engine, for applying torque through a hydraulic torque converter followed by a forward-reverse gearbox to the drive axle. This torque converter is a three element torque converter of known type which changes automatically into a hydraulic coupling.

In order to solve the air pollution problem, it has heretofore been proposed to employ a gas turbine engine, which discharges relatively clean exhaust gases, as the prime mover for automobiles. As is known in the art, automobiles demand great torque at low vehicle speeds, and hence it is desirable to use a dual-shaft gas turbine engine which provides greater torque at low engine revolution speeds. The dual-shaft gas turbine engines, however, are difficult to control, requiring intricate nozzle control, and are more expensive to manufacture than conventional piston engines for automobiles.

The present invention provides an automotive vehicle drive from a single-shaft gas turbine engine.

The single-shaft gas turbine engine is claimed to be low in cost to manufacture and simple in construction, and thus most desirable as the prime mover for automobiles, especially suitable for passenger cars. However, the single-shaft gas turbine engine has inherent poor torque characteristics and requires a drive that must compensate for such poor torque characteristics of the engine.

There have been several attempts made to provide a suitable drive for automobiles, in which the driving shaft is actuated by means of an electric motor receiving its power from a generator driven by a single-shaft gas turbine engine, and exerting this power by means of torque on the driving shaft. Attempts have also been made to provide a drive in which an electric motor actuating the driving shaft receives its power from a battery which is charged with current produced by a generator driven by a single-shaft gas turbine engine. The aforementioned two types of drives are not efficient since all the mechanical power is converted to electric energy and this electric energy is again converted to mechanical power to drive the driving shaft. The losses of energy are thus relatively great with the aforementioned systems.

It is an object of the present invention to provide an automotive vehicle drive of a single-shaft gas turbine engine, in which during low and intermediate engine speeds where the engine can not drive the vehicle by itself due to its poor torque, the engine torque is compensated for by an electric motor torque, and during high engine speed the vehicle is driven by the engine alone.

The present invention will become more apparent from the following description, read in conjunction with the accompanying drawings, in which.

Figure 1:
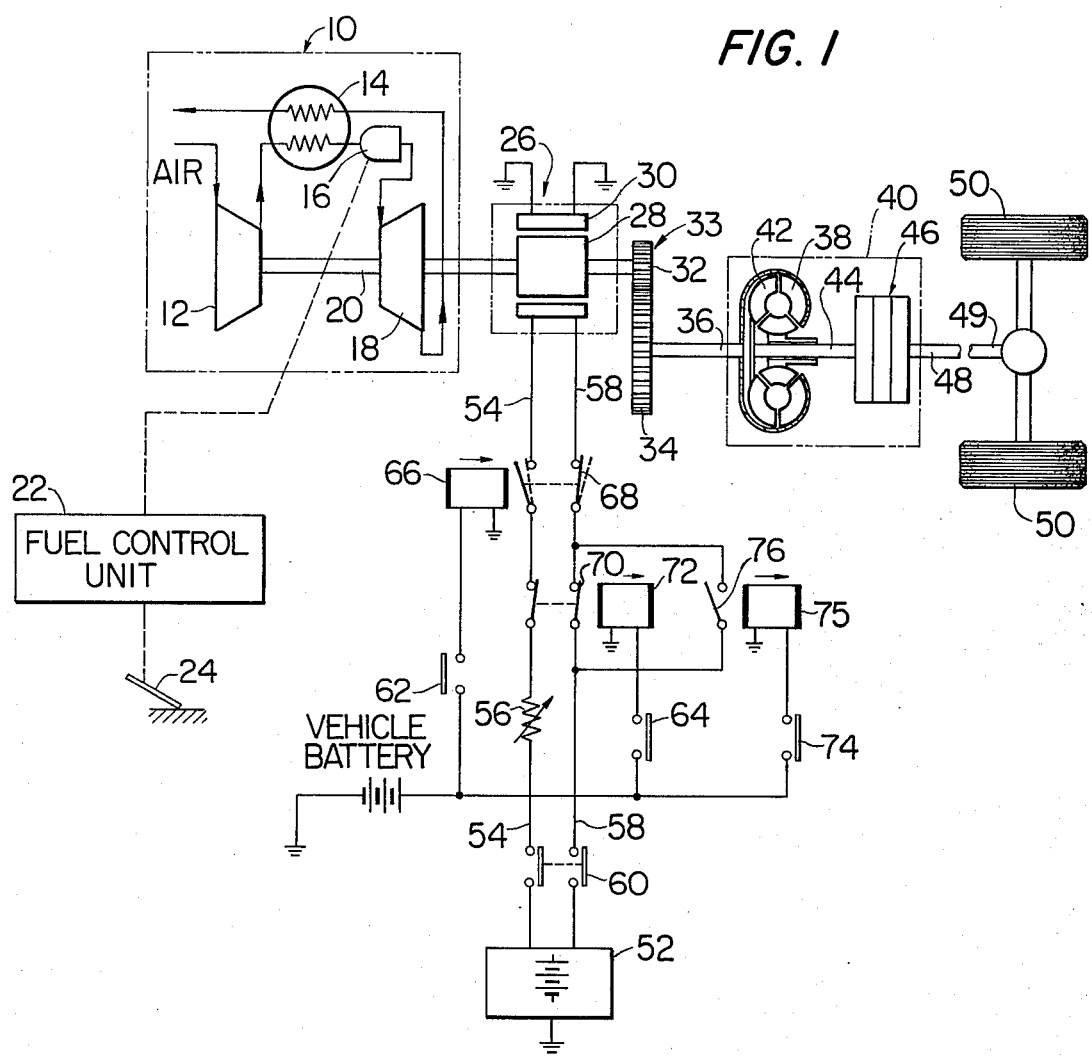
FIG. 1 is a diagrammatic layout of an automotive vehicle drive constructed in accordance with the present invention, also illustrating the electric control circuit for the drive.
Figure 2:
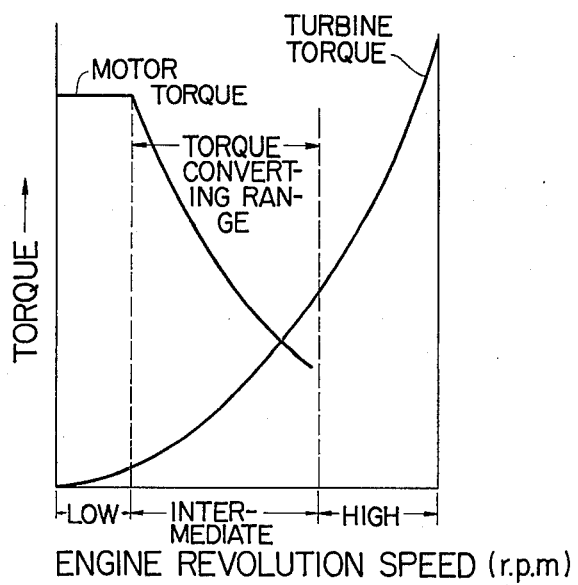
FIG. 2 is a graph illustrating torque versus engine revolution speed of the drive shown in FIG. 1.
Figure 3:
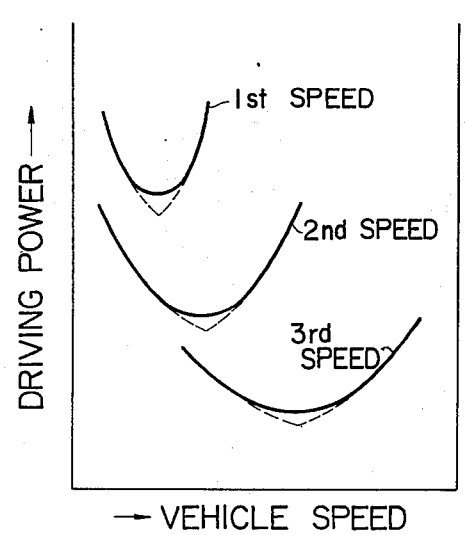
FIG. 3 is a graph illustrating the performance characteristics of the drive shown in FIG. 1.

Reference is now made to FIG. 1 of the drawings. Indicated generally at 10 is a single-shaft gas turbine engine which includes an air compressor 12. The air compressor 12 discharges compressed air through a heat exchanger 14 to a combustor 16. Fuel (not shown) is supplied to the combustor 16 for combustion therein. The high temperature and pressure combustion product discharged from the combustor 16 is supplied to a turbine 18 to rotate it and exhausted through the heat exchanger 14, where heat is transferred to the compressed air passing therethrough. Turbine 18 drives compressor 12 through a turbine shaft 20. Fuel supplied to combustor 16 is controlled by a fuel control unit generally indicated at 22 which determines the quantity of fuel depending on input parameters, including a parameter representative of the depressed position of a vehicle accelerator pedal 24. Such engine construction and control unit are well known per se and are not described any further.

The turbine shaft 20 extends through a motor-generator indicated generally at 26, which carries an armature 28 surrounded by an electric field 30. This turbine shaft 20 extends outwardly of the motor-generator 26 and is connected at its extended end to an input gear 32 of a reduction gear train 33, the output gear 34 of which is carried by a shaft 36 coupled to pump element 38 of a three element hydraulic torque converter indicated generally at 40. The torque converter 40 has a turbine element 42 connected to an input shaft 44 of a forward-reverse gearbox, in this case a three forward and one reverse speed gearbox generally indicated at 46, the output shaft 48 of which forms a propeller shaft 49 which, through a universal coupling and differential (not shown), is connected for driving the axles of driving wheels 50.

The motor-generator 26 is electrically connectable to a motor vehicle battery 52 selectively through a conductor circuit 54 having a variable resistor 56 for controlling the motor speed dependent on the depressed position of accelerator 24 or through an electric current charging conductor circuit 58. The motor-generator 26 acts as a motor when the conductor circuit 54 is closed to apply the motor torque on turbine shaft 20, while it acts as a generator when the conductor circuit 58 is closed to produce electric current to charge the battery 52.

Referring to the electric control circuit illustrated in FIG. 1, there is shown the condition when the engine 10 is not operated. It will be noted that since a main switch 60 which is closed when the engine 10 is operating is opened, the motor-generator 26 is electrically disconnected from the motor battery 52.

When the engine is idling, vehicle accelerator pedal 24 is in the released position and an acceleration switch 62 is open, an engine speed switch 64 is open, and thus the motor-generator 26 is here electrically connected to the battery 52 through the conductor circuit 58. The turbine shaft 20 of the engine 10 drives the armature 28 of the motor-generator 26 to produce electric current during the idling operation. During this operation the impeller shaft 36 rotates at a reduced speed than that of the shaft 20 and freely rotates.

During starting the vehicle and the subsequent operation thereof with the vehicle accelerator pedal 24 depressed, the accelerator switch 62 which is designed to be closed as long as the engine accelerator pedal is depressed, is closed to energize an associated solenoid 66, thereby moving the corresponding relay switch contacts 68 to the position shown in broken lines. Thus the motor-generator 26 applies a heavy torque to the turbine shaft 20 to drive the impeller element 38 of the torque converter 40. Simultaneously the impeller element of the torque converter is driven by the engine torque through the same power train. However, the starting torque of the motor-generator is much greater than the initial starting torque of the single-shaft gas turbine engine which has poor torque characteristics at low engine speeds, and consequently, the initial movement and the subsequent movement of the vehicle is produced almost entirely by the motor-generator 26. However, as the engine speeds up, its torque increases, and consequently the movement of the vehicle at its intermediate speeds is produced by the engine torque and the motor torque. The accelerator switch 62, the relay switch comprised of solenoid 66 and relay switch contacts 68, and battery jointly comprise mode control means for connecting the motor-generator 26 to operate in a motor mode to drive the vehicle, and to operate in a generator mode to charge the electrical energy source or battery 52.

This dual drive proceeds until a predetermined engine speed is reached. Here the engine 10 produces great torque and is able to drive the vehicle without the aid of the motor torque. At this point, i.e., the predetermined engine speed, the electric system is disconnected upon opening switch contacts 70 by solenoid 72 which is energized by the closure of the engine speed switch 64, and the armature 28 of the motor-generator 26 begins to freely rotate with the turbine shaft 20, and the engine which is now capable to carry the entire load, drives the vehicle.

When the vehicle accelerator pedal is released during the dual drive, the motor-generator 26 acts as a generator to produce electric current because the acceleration switch 62 is opened in response to the release of the vehicle accelerator pedal 24, as will be readily understood.

The shift from dual drive to engine drive alone may be made if the engine speed switch 64 is operatively connected with a tachometric generator (not shown) coupled with the turbine shaft 20 such that it is closed when the engine speed exceeds a predetermined speed, so that the motor-generator 26 is electrically disconnected from the motor battery 52 during high engine speed. The relay switch comprised of switch contacts 70 and solenoid 72, engine speed switch 64, and vehicle battery jointly comprise engine speed responsive means for disconnecting the motor-generator 26 from the electrical energy source or motor battery 52 when the turbine 10 speed exceeds the predetermined value.

When it is desired to effect deceleration of the vehicle, a brake switch 74 can be operated simultaneuously with the vehicle brake pedal (not shown) to complete the circuit 58 by a solenoid 75 closing switch contacts 76, thereby charging electric current to the battery 52, and thereby applying a retarding force to the turbine shaft 20 to supplement the action of conventional type of brakes of the vehicle. The relay switch comprised of solenoid 75 and contacts 76, brake switch 74, and vehicle battery jointly comprise electrical braking control means for connecting the motor-generator 26 to the motor battery 52 to supply electrical energy thereto, to load the motor-generator 26 and thereby brake the motor vehicle.

The automotive drive of the present invention has the following advantages.

1. Since the drive permits engine drive in high engine speed range, where a single-shaft gas turbine engine will produce torque great enough to carry the load, the efficiency is improved, as compared to the conventional types of drive wherein all the mechanical power is converted to electric power to drive the vehicle throughout the whole vehicle speed range.

2. Since engine torque is supplemented by motor torque and the combined torque is multiplied by the torque converter in low and intermediate engine speed ranges, the torque characteristics is improved.

3. The vehicle start and the subsequent acceleration of the vehicle which are frequent during city driving are mainly caused by the electric motor, and furthermore the single-shaft gas turbine engine produces clean exhaust gas automotive driving with clean exhaust gas is thus accomplished by the invention.

In summary, it is appreciated that according to the automotive drive of the invention, efficiency has been improved causing saving of fuel, and vehicle driving with clean exhaust has been accomplished.

What is claimed is:

1. An automotive vehicle drive, comprising: a single shaft gas turbine engine having an output turbine shaft; a hydraulic torque converter driven by the output turbine shaft and including a forward-reverse gearbox; a motor-generator having an armature connected to the turbine shaft to rotate therewith and an electric field surrounding the armature; a battery; an accelerator switch which is closed as long as an accelerator pedal is depressed; an engine speed switch which is closed when the engine speed is higher than a predetermined level; a brake switch which is closed when a brake pedal is depressed; a first relay switch having a first pair of normally open contacts and a second pair of normally closed contacts, the first pair of normally open contacts of said first relay switch being connected in series with said electric field and said battery, the second pair of normally closed contacts of said first relay switch being connected in series with said electric field and said battery and in parallel with the first pair of normally open contacts; a first solenoid coactive with said first relay switch and connected in series with the accelerator switch, said first solenoid when energized urging said first relay switch to close the first pair of normally open contacts thereof and to open the second pair of normally closed contacts thereof; a second relay switch having a first pair of normally closed contacts and a second pair of normally closed contacts, the first pair of normally closed contacts of said second relay switch and the second pair of normally closed contacts of said second relay switch being connected with the first pair of normally open contacts of said first relay switch and the second pair of normally closed contacts of said first relay switch, respectively; a second solenoid coactive with said second relay switch and connected in series with said engine speed switch, said second solenoid when energized urging said second relay switch to open the first pair of normally closed contacts thereof and the second pair of normally closed contacts thereof; a sixth switch having a pair of normally open contacts connected in parallel with the second pair of normally closed contacts of said second relay switch; a third solenoid connected in series with said brake switch, said third solenoid when energized urging said sixth switch to close the pair of normally open contacts thereof; and a variable resistor connected with the first pair of normally closed contacts of said second relay switch.

2. In a motor vehicle of the type having an electrical energy source, a turbine engine for driving the vehicle, and a motor-generator coupled for rotation with said turbine engine and energizable by said electrical energy source to operate in a motor mode for driving the vehicle; an improved control circuit which comprises:
   a. mode control means actuatable for connecting said motor-generator to said electrical energy source to operate in the motor mode to drive the vehicle, and for connecting said motor-generator to operate in a generator mode and supply electrical energy to said electrical source while being rotated;
   b. engine speed responsive means for disconnecting said motor-generator from said electrical energy source when the turbine engine speed exceeds a certain value and when said motor-generator is operating in the motor mode, whereby the vehicle is driven entirely by said turbine engine when the turbine engine speed exceeds said certain value; and
   c. electrical braking control means responsive to the braking of the motor vehicle for connecting said motor-generator to said electrical energy source and to operate in the generator mode during braking of the motor vehicle and irrespective of the turbine engine speed, thereby to supply electrical energy to said electrical energy source and increase the drag on said turbine engine to enhance braking of the vehicle.

3. In a motor vehicle according to claim 2, further comprising: an accelerator for controlling the turbine engine speed; and wherein said mode control means comprises a relay switch having a pair of normally open contacts and a pair of normally closed contacts, means for energizing said relay including a switch coactive with said accelerator to open said normally closed contact and to close said normally open contacts upon actuation of said accelerator, a first electrical circuit connecting said motor-generator to said electrical energy source through said normally closed contacts to supply electrical energy from said motor-generator operating in the generator mode to said electrical energy source, and a second electrical circuit connecting said motor-generator to said electrical energy source through said normally open contacts for energizing said motor-generator to operate in the motor mode and drive the vehicle when said accelerator is actuated.

4. In a motor vehicle according to claim 3, wherein said engine speed responsive means comprises: a second relay switch having two pair of normally closed contacts, wherein a first of these pair of normally closed contacts is connected in series in said first electrical circuit, and the second of these pair of normally closed contacts is connected in series in said second electrical circuit; and means for energizing said second relay switch when the turbine engine speed exceeds said certain value to open said two pair of normally closed contacts and disconnect said motor-generator from said electrical energy source.

5. In a motor vehicle according to claim 4, wherein said electrical braking control means comprises: a third relay switch having a pair of normally open contacts connected in parallel with said first pair of normally closed contacts of said second relay switch; and means for energizing said third relay switch upon braking of the vehicle to close said pair of normally open contacts of said third relay switch and complete said first electrical circuit irrespective of the opening or closure of said first pair of normally closed contacts of said second relay switch.

* * * * *